(12) United States Patent
Van

(10) Patent No.: US 8,229,224 B2
(45) Date of Patent: Jul. 24, 2012

(54) HARDWARE MANAGEMENT BASED ON IMAGE RECOGNITION

(76) Inventor: David Van, Jersey City, NJ (US)

(*) Notice: Subject to any disclaimer, the term of this patent is extended or adjusted under 35 U.S.C. 154(b) by 433 days.

(21) Appl. No.: 12/641,363

(22) Filed: Dec. 18, 2009

(65) Prior Publication Data
US 2011/0150336 A1 Jun. 23, 2011

(51) Int. Cl.
*G06F 15/16* (2006.01)
*H04L 12/66* (2006.01)
*H04B 1/38* (2006.01)

(52) U.S. Cl. ......... 382/181; 709/250; 370/463; 375/220

(58) Field of Classification Search .................. 382/181; 348/E5.008, E7.06, E5.006, E7.07; 375/220, 375/E7.009, E7.024; 370/463, 545; 705/53, 705/57, 80; 709/25, 250; 710/119, 104, 710/260; 716/102, 117; 700/82; 1/1; 713/193, 713/164; 719/321; 714/13
See application file for complete search history.

(56) References Cited

U.S. PATENT DOCUMENTS

| | | | | |
|---|---|---|---|---|
| 5,708,810 A * | 1/1998 | Kern et al. | ...................... | 717/162 |
| 2008/0300859 A1* | 12/2008 | Chen et al. | ......................... | 704/7 |
| 2009/0157695 A1* | 6/2009 | Roberts | ............................. | 707/10 |
| 2010/0262620 A1* | 10/2010 | Mohan | ............................ | 707/776 |
| 2010/0278453 A1* | 11/2010 | King | .............................. | 382/321 |
| 2011/0055699 A1* | 3/2011 | Li et al. | ........................... | 715/709 |
| 2011/0188783 A1* | 8/2011 | Minoni et al. | ................ | 382/314 |

* cited by examiner

*Primary Examiner* — Sheela Chawan
(74) *Attorney, Agent, or Firm* — Michael J. Feigin, Esq.; Feign & Associates, LLC

(57) ABSTRACT

Embodiments of the disclosed technology allow for the control, monitoring, and/or configuration of specialized hardware devices with proprietary interfaces from a central interface capable of interacting with one or a plurality of specialized hardware devices via respective proprietary interfaces. Such embodiments are especially useful in controlling medical equipment, such as radiology equipment at a central and/or remote location, where otherwise, only a proprietary interface at a proximate location could be used to do same.

20 Claims, 8 Drawing Sheets

| Num | Field Type | Field/Label |
|---|---|---|
| 315 | TAB | 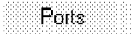 |
| 314 | Editable Field |  |
| 316 | Fixed Field |  |
| 320 | Label Name |  |
| 311 | Button | 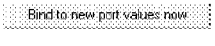 |
| ... | | |
| n | | |
Figure 4

```xml
<Table ss:ExpandedColumnCount="2"
ss:ExpandedRowCount="5" x:FullColumns="1"
  x:FullRows="1">
  <Row>
   <Cell ss:Index="2">
<Data ss:Type="String">Ports</Data></Cell>
  </Row>
  <Row>
   <Cell ss:Index="2"><Data
ss:Type="Number">25</Data></Cell>
  </Row>
  <Row>
   <Cell ss:Index="2"><Data
ss:Type="Number">995</Data></Cell>
  </Row>
  <Row>
   <Cell ss:Index="2"><Data
ss:Type="String">Miscellaneous
ports</Data></Cell>
  </Row>
  <Row>
   <Cell ss:Index="2"><Data
ss:Type="String">Bind to new port values
row</Data></Cell>
  </Row>
  </Table>
```

Figure 5

HARDWARE MANAGEMENT BASED ON IMAGE RECOGNITION

FIELD OF THE DISCLOSED TECHNOLOGY

The disclosed technology relates generally to configuring specific hardware devices and, more specifically, to methods of interfacing with the hardware devices.

BACKGROUND OF THE DISCLOSED TECHNOLOGY

In the information technology world, standard protocols have long been developed to monitor and interface with various hardware products, including printers, scanners, backup drives, servers, and so forth. From one point on the network, a network operator may run diagnostics, use and modify the configuration of any one of these devices or many of them at once. However, in other industries, interfaces are proprietary and require specific cables and equipment or specific code or instructions, whether on the computer or a printed page, to be executed as provided by the manufacturer and and which do not interface with other technologies. Medical equipment operations, such as operating, running tests on, or configuring MRI and CAT scan machines, require an individual user interacting with a proprietary interface. Medical equipment operations are generally autonomous. Each silo of operations places heavy dependency on the equipment's manufacturer to provide the management as part of the maintenance contract. Original equipment manufacturers (OEMs) use proprietary hardware interfaces, diagnostic software tools, communication protocols, etc., and the OEMs are not willing to release any specification, application protocol interface (API), or software development kit (SDK) to allow 3rd-party integration. As such, the medical equipment silos continue to operate as black-boxes, and only OEM-supplied tools can be used to monitor specific medical equipment in service. This practice is slow to change because the manufacturers do not want it to, as they can capitalize on services revenue; and customers do not know how to, because there is no off-the-shelf product on the market as alternative to the manufacturers' offerings.

The challenge of establishing a standard capability to monitor and interface with medical equipment and any other equipment with only proprietary interfaces is that there is no standardized and consistent method for accessing, navigating, analyzing, and diagnosing issues on such equipment.

What is needed in the art of hardware equipment is a common scheme for interfacing with proprietary hardware. The need for a technology that can universally interface with all OEM's proprietary hardware and software, creating a standardized proactive monitoring platform to manage hardware equipment across the board has been long felt and is unsolved.

SUMMARY OF THE DISCLOSED TECHNOLOGY

It is therefore an object of the disclosed technology to find, for various types of specialized hardware devices, elements of a provided user interface and provide a second combined user interface for operation thereof.

It is a further object of the disclosed technology to allow automated management of one or a plurality of hardware devices with proprietary interfaces using a common or combined interface.

It is further object of the disclosed technology to interpret an image acquired using a camera, scanner, screenshot, or other input mechanisms and carry out instructions and/or manipulate an interface based on the acquired image.

A device of embodiments of the disclosed technology exhibits a common interface with interacting capabilities for a plurality of proprietary user interfaces. Each proprietary user interface allows for interaction with a specialized hardware device. The device of embodiments of the disclosed technology comprises a camera with means for recording an image of each proprietary user interface. A camera is a device that records images, either as a still photograph or as a moving image, whether analog or digital, and includes taking a screenshot. Optical character recognition means are used to extract text from the image, and sensing means are used for extracting specific locations within the image, the locations having actionable objects within the image. These actionable objects may be physical levers, buttons, places where data is entered (input fields), drawn buttons, fields for data entry, selectable tabs, and the like on a computer screen or a combination thereof. Exhibiting means, such as a liquid crystal or other display, exhibit actionable data resulting from output from the optical character recognition means and the sensing means. Such output is exhibited in a common user interface.

In embodiments of the disclosed technology, the device propagates a user-configured change to actionable objects in the common user interface to the specialized hardware device via the proprietary user interface. That is, in the common user interface, created by the device of the disclosed technology, a user may interact with an actionable object, such as a button, field, or the like. Upon doing so, this change is sent to the proprietary user interface to change a setting/interact with a specialized hardware device, such as a piece of biomedical equipment (e.g., a radiology machine). In this manner, the user may act remotely, make a change to multiple pieces of equipment at once, and so forth, depending on the configuration of the common interface.

In an embodiment of the disclosed technology, at least one said proprietary user interface is interactable only at a proximate physical location of said specialized hardware device. Interactable is defined as being able to modify at least the majority of, if not all, settings for the device including those used in day to day operation and those used to configure or perform routine maintenance and/or repairs on the device. Proximate physical location is defined as within the same room or within a line of sight as the specialized hardware device, e.g., within 100 feet or 30 meters from the device.

The common interface, however, may be at a location remote from the proximate physical location of the proprietary user interface—that is, outside of the proximate physical location and up to a (theoretical) infinite distance away from the actual specialized hardware device and/or proprietary user interface.

The sensing means may include field classification and detection, that is, the classification of field types and the detection of where a user may enter or change data into a proprietary interface. A field may be any input, such as a text box, radio button, drop down box, or the like. Edge detection may be further employed, in conjunction with the field detection, to determine exact locations of fields. Color manipulation (e.g., inverting, changing to gray scale, changing the hue, saturation, color balance) may be further employed as part of the edge detection.

The exhibiting means may comprise exhibiting a common user interface in a structured data format configured for a human-configured automated process to monitor at least one of the specialized hardware devices. That is, an automated or pre-programmed device may be used to carry out tasks with the common user interface, the interface having a structured data format, in order to ultimately change or monitor the configuration of a specialized hardware device.

In a method for manipulating a specialized hardware device in embodiments of the disclosed technology, the method proceeds by receiving an image of a proprietary user interface of the specialized hardware device, using optical character recognition to extract text from the image, extracting locations of actionable objects exhibited in the image in the process, further connecting the actionable objects with the text, and, finally, creating a common interface based on the text and the actionable objects for manipulating the specialized hardware device. The common interface may be used for manipulating a plurality of proprietary user interfaces, including monitoring and/or modifying a configurable element of a specialized hardware device, such as biomedical equipment (e.g., a radiology machine). Aspects of the device of the disclosed technology are also applicable to this method of the disclosed technology.

BRIEF DESCRIPTION OF THE DRAWINGS

FIG. 4 shows the data gleaned from the image of FIG. 3 in table format.

FIG. 5 shows an example of structured data output representing controls of a proprietary interface, usable in a common interface.

DETAILED DESCRIPTION OF EMBODIMENTS OF THE DISCLOSED TECHNOLOGY

Embodiments of the disclosed technology allow for the control, monitoring, and/or configuration of specialized hardware devices with proprietary interfaces from a central interface capable of interacting with (e.g., controlling, monitoring, or configuring) one or a plurality of specialized hardware devices via respective proprietary interfaces. Such embodiments are especially useful in controlling medical equipment, such as radiology equipment (e.g., MRIs (magnetic resonance imaging) and CAT scan machines). This is accomplished by way of interpreting the proprietary interface, which is human interactable, and developing automated processes within a device capable of the interaction. The proprietary interface is "learned," e.g., locations of buttons, locations for entry of objects (e.g., a physical object such as a disk or cable or a field on a computer screen) are determined, and optical character recognition is used to label the associated inputs and configurable items.

Such gleaned data is then provided, for one or a plurality of specialized hardware devices, in a combined user interface. This combined user interface may now be converted into a new or standard format such that the hardware devices are interfacable via the newly exhibited interface. This exhibited interface may, for example, be at a remote location, may enable the configuration of multiple hardware devices at once, and may allow for user pre-programmed automation of tasks and management of the hardware devices. This may be by way of a computer readable interface, such as an XML (extensible markup language) script or the like.

Embodiments of the disclosed technology will become clear in the light of the following description of the figures.

Figure 1:
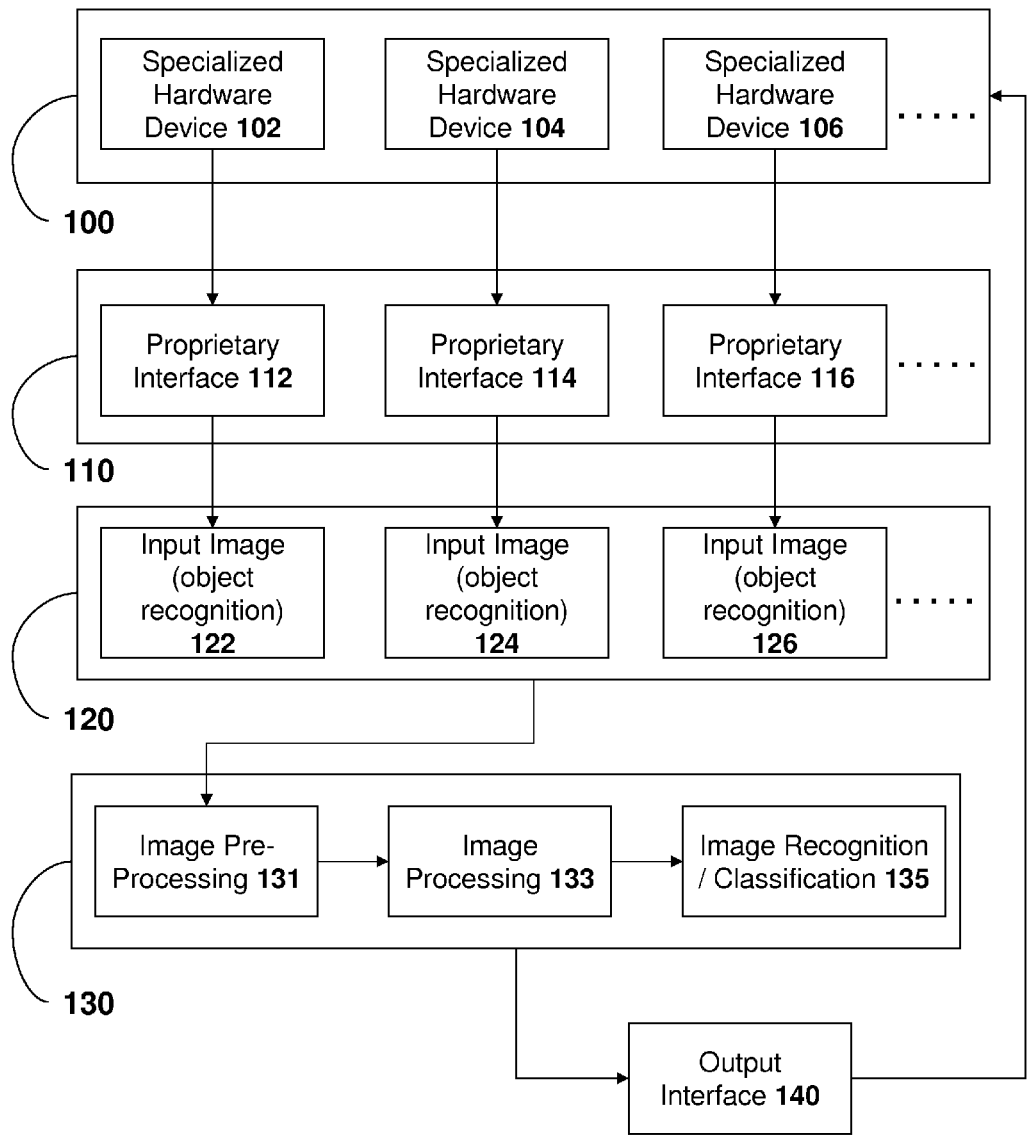
FIG. 1 is a high level block diagram of devices and methods of the disclosed technology.

FIG. 1 is a high level block diagram of devices and methods of the disclosed technology. Specialized hardware devices 100, which may include a plurality of such devices 102, 104, 106 and so on, each have proprietary interfaces 110, such as proprietary interfaces 112, 114, 116, and so on. (Some of the specialized hardware devices may have an interface readily interactable with a third party interface, e.g., do not have proprietary interfaces or have at least one open interface.) A specialized hardware device is a device which carries out a specific, specialized, function, such as a piece of medical equipment, or more specifically, a piece of radiology equipment such as an MRI or CAT scan machine. A proprietary interface, for purposes of this disclosure, is a method of interfacing with a hardware device which is designed to be the only method or control for a specific make and model of a hardware device or group of hardware devices from a particular manufacturer and is not machine interfaceable with third party hardware or software interfaces.

Input images 120 are provided which may comprise images of each proprietary interface. As shown in FIG. 1, input image 122 is an image of proprietary interface 112, input image 124 is an image of proprietary interface 114, input image 126 is an image of proprietary interface 116, and so forth. It should be understood that for each proprietary interface 110, a plurality of input images 120 may be inputted. For example, a touch screen interface for a copy machine may have dozens of screens. An operator, manually, or in an automated process, in embodiments, cycles through each displayed screen and records an input image, such as with a camera. A camera may be one with a lens and sensor, a screenshot mechanism, a digital interface between an electric output and a physical display, or the like. In each of these cases, at least one input image is received for each proprietary interface.

Still referring to FIG. 1, in a series of interface detection steps 130, the inputted images are interpreted to find actionable areas and labels associated with the actionable areas. Image pre-processing 131 takes place to modify the image to allow for easier processing of the image. The input images 120 are processed for subsequent steps of data garnering and interpretation. Such processing steps might include any or more than one of reducing the physical dimensions of an input image, determining parametric data, and determining descriptions displayed within the image. The reasons for this transformation are to accelerate the process of recognition in subsequent steps, to reduce resource requirement for the recognition processes, and to increase performance for subsequent processing. Thus, any of the following may be carried out: a) reduction of picture data size, b) transformation of data format of the image, c) color map transformation, d) size and dimension changes, and/or e) extraction of data.

Different input conditions may require different changes. For example, size of an input image can be a critical factor because smaller pixel size can be very quick to process, but a lot of data showing specific characteristics may be lost. Thus, the pre-processing 131 may depend on size of the input image, type of image (e.g., JPG vs. BMP format, or 16.7 million color vs. gray scale), lighting/contrast conditions (normalizing all input images to same level of light may be required), remapping of a color map to another one (grayscale picture, colored picture, black/white picture), color filtrations, and others.

Image processing 133, that is, a form of sensing means, then takes place where edges, input fields, fields and buttons leading to exhibiting of other images, and so forth are determined. Transformations of the image and detection of, for example, lines and text (such as through OCR (optical character recognition) may be used to determine edges, location of fields and buttons, and the like. Thus, the borders of components of the image are determined. Referring specifically to edge detection, this is accomplished, in embodiments of the disclosed technology, by creating an exact border for each object inside the image by converting the object to different colors, shades, or the link. Different methods can be used for this task. An input image from image pre-processing can yield output of pictures based on the number of components inside the input image (e.g., from a proprietary interface 110 exhibited in a display). Principles of minimum/maximum threshold changes in color or texture, segmentation by edge detection, segmentation by template comparison, computation of an image gradient, phase congruency based edge detection, and others may be used to determine edges.

In image recognition/classification 135, shown in FIG. 1, e.g., further sensing means, one or a plurality of image component classification, recognition, and data extraction takes place. This block, as well as the output interface 140, is described in greater detail with reference to FIG. 2.

Figure 2:
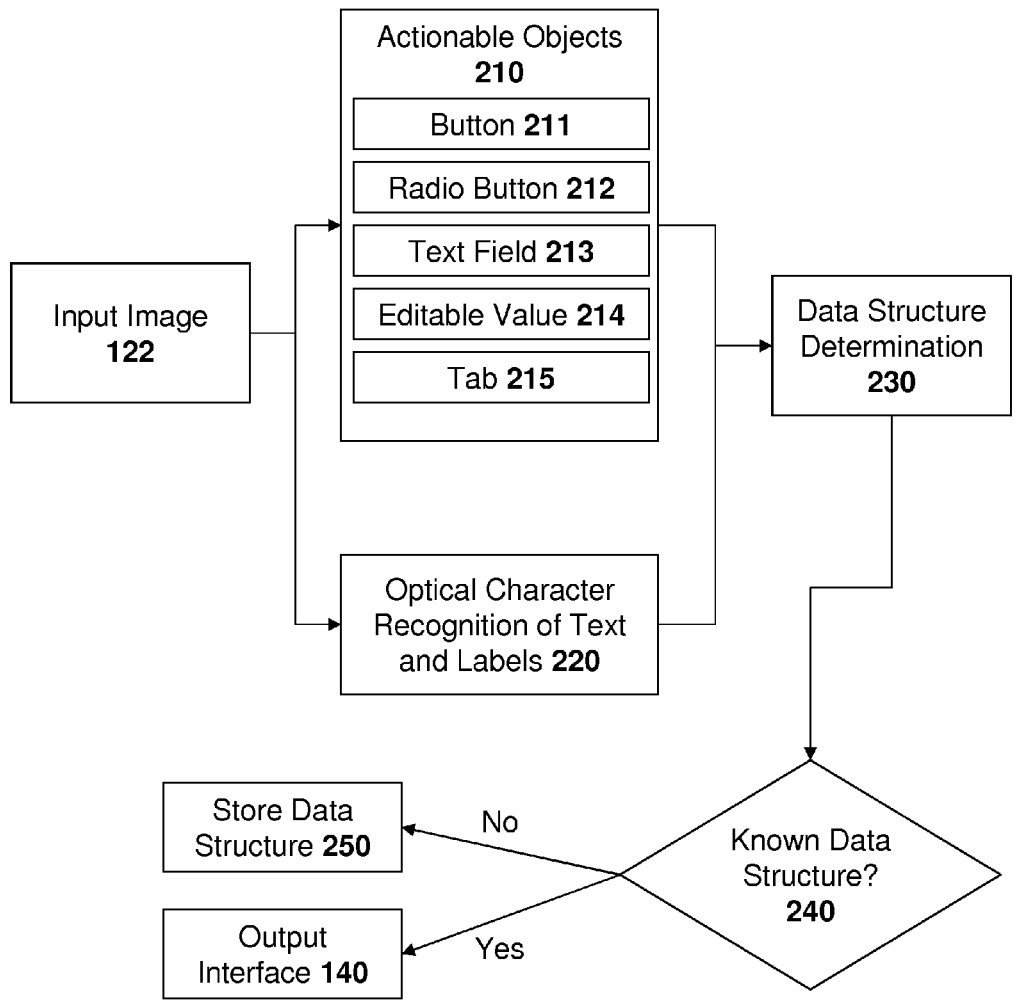
FIG. 2 is a high level block diagram of image recognition and classification methods for extracting locations of objects within an image in embodiments of the disclosed technology.

FIG. 2 is a high level block diagram of image recognition and classification methods for extracting locations of objects within an image in embodiments of the disclosed technology. An input image, such as input image 122 (of FIG. 1) is analyzed with sensing mechanisms, such as OCR, edge detection, and so forth. Various techniques are known in the art for sensing data within an image including are known to a person having ordinary skill in the art. The location of actionable objects 210 and how to interface with these objects are determined. Such actionable objects 210 may include buttons 211 (e.g., when depressed, a function is carried out), radio buttons 212 (e.g., a selectable object), text fields 213 (e.g., allowing any text to inputted), editable value 214 (e.g., a numerical input), tab 215 (e.g., allowing for viewing of another menu or display, in many cases, with further actionable objects 210). These actionable objects 210 may be located via sensing means such as standard patterns and known features (e.g., a standard border/edge, shading, size, etc.). In step 220, optical character recognition of text and labels 220 is used to allow for recreation of such text and labels in the common interface (e.g., output interface 140) to be created.

Still referring to FIG. 2, in step 230 a data structure is determined. That is, based on the data gleaned in steps 210 and 220, data referring to the location and type of editable objects as well as their text labels, present values, and so forth is placed into a structured format, such as XML structure or otherwise. This structure may be readable and editable by an automated process and, of course, for each specialized hardware device 100, a data structure determination 230 may be made and, in a common interface, this information may be manipulated to effect a change which is carried out through the proprietary interface. This change may be by way of a common instruction set sent to a user at a proximate location (e.g., "pull lever L") or act within a keyboard/mouse interface (e.g., click a button 211 or enter "echo y|format c:" in a text field 213).

In step 240, it is determined whether the data structure, that is the structure determined in step 230, is known. If it is not known, the data structure, optionally, is stored in step 250 and may be retrieved when the data structure is detected again, such as for a different input image 122 (or plurality of input images 122) for a specific hardware device, e.g., hardware device 112. Then, the interface is outputted in step 140, which may be an output of the data structure described with reference to step 230 and/or a user interface comprising, for example, a new set of actionable objects 210, text, and labels. In this manner, a plurality of devices may be monitored, controlled, or otherwise interfaced with via a common interface, such as one at a location separate from each of the particular hardware devices 110. Thus, an MRI machine in Iraq, a CAT scan machine in Afghanistan, and a control tower in Turkey with proprietary interfaces may be centrally monitored and configured from Alabama.

Further, if the data structure is recognized in step 240, manual tweaks to the relevant output interface 140 may be loaded. As an example of this, it is possible that an automated system used to carry out the production of the input image 122, determination of actionable objects 210, and/or production of the data structure 230 is known to produce an error, such as mis-locating an actionable object or reading certain characters incorrectly, thus, producing a less than fully functional output interface 140. However, this may have been known, recognized, and corrected by a previous user or in a previous iteration of producing a data structure 230 and/or in producing an output interface 140 for a particular hardware device. As such, when the data structure is known in step 240, based on a previously stored data structure in a previous iteration of step 250, a better output interface 140 is used.

Still further, it may be computationally heavy (requiring a lot of time or processing power) to carry out steps 122, 131, 133, and 135. Thus, to cut down on processing cost or time to produce an interface, upon receiving enough information to make a determination of data structure in 230, or some subset thereof (e.g, having optical character recognition in step 220 read a label, "MRI Master 6-5000 Merlin Interface v2.4" from an image), it may be determined, based on a previously mapped interface, what the data structure of the current hardware device is. Using this information, the data structure is determined as known in step 240 and may be loaded, without re-processing the entire proprietary interface.

Figure 3:
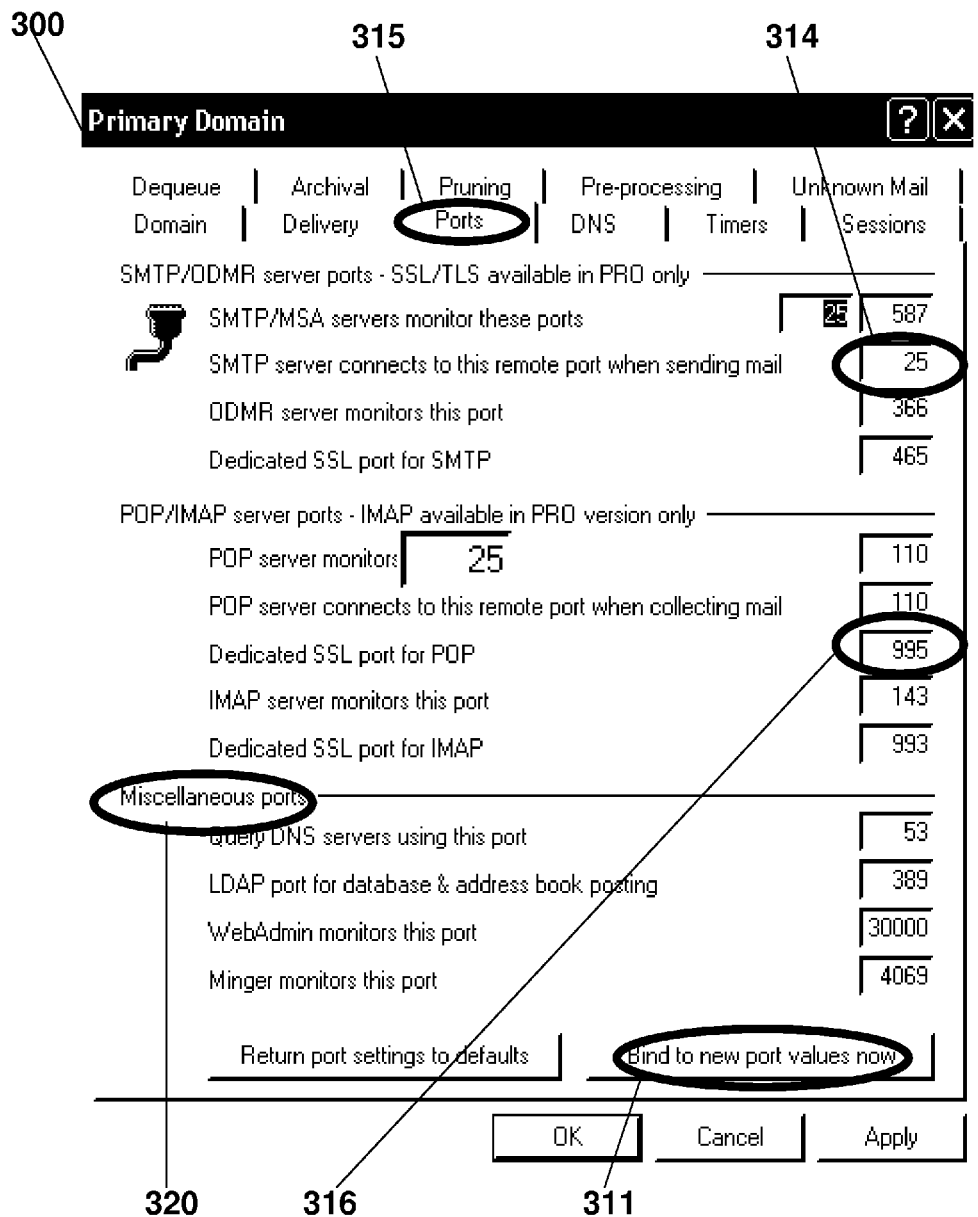
FIG. 3 shows an example of an image of a frame of a proprietary interface for a specialized hardware device in an embodiment of the disclosed technology.

FIG. 3 shows an example of an image of a frame of a proprietary interface for a specialized hardware device in an embodiment of the disclosed technology. Where possible, elements of FIG. 3 have been incremented by 100 compared to similar elements in FIG. 2. The image 300 comprises a tab 315 named "Ports" which is currently selected, and various fields and data associated with ports are shown below. As the interface shown uses a typical GUI (graphical user interface), detection based on color, location, and OCR may be utilized to aid in determining editable fields and the like. In addition, other tabs may be detected and selected to show further editable elements. Fixed elements, such as fixed element 316, in this case, the dedicated SSL port for POP (an encrypted connection to a point of presence mail server) comprises a value of "995" which may be read and placed in, for example, maintenance software for monitoring current configuration settings in a common interface for a plurality of specialized hardware devices. A label 320, in this case, serves a header for a group of editable fields. A button 311 allows changes to take effect immediately. In a common interface, the values shown may be edited and the button selected to allow the changes to take hold.

FIG. 4 shows the data gleaned from the image of FIG. 3 in table format. The image 300 comprises elements 311, 314-316, and 320. For each element, a field type can be developed for a tabular output as shown in the "Field type" column, corresponding to a specific field or label, shown in the third column. Thus, for example, the tab 315 refers to a specific portion of the image as shown in the first row, third column. Using OCR software, such as, for example, the Google Tesseract Engine, as is known in the art, the field/label portions of the image 300 are converted, in embodiments of the disclosed technology, into text. The text can then be reprinted in a new interface and/or manipulated or stored, as will be discussed in more detail with respect to FIG. 5.

FIG. 5 shows an example of structured data output representing controls of a proprietary interface, usable in a common interface. Such structured output may be the result of a combination of field detection and OCR. In this example, the data is a text version of the data shown in FIGS. 3 and 4, that is, a text version of the data from elements 311, 314-316, and 320. The data shown is in XML format. The data shown is readably understandable by one of ordinary skill in the art, e.g. "<Cell>" refers to a new cell of a table, and the "<Data>" tag refers to a specific piece of data, e.g., "Ports," which is closed by the end tag, "</Data>". This data can now be used to populate a human readable user interface, or compiled with data from other specialized hardware devices and placed into a single user interface for monitoring. Via such an interface, or via an automated process configured by a person beforehand based on a set of rules, such data may be modified and used to act upon the buttons, fields, and the like in the proprietary interface to select the appropriate options, change the values of fields, and so forth.

Figure 6:
FIG. 6 shows an example of threshold methods of an image of a proprietary interface in an embodiment of the disclosed technology.

FIG. 6 shows an example of threshold methods of an image of a proprietary interface in an embodiment of the disclosed technology. Here, such a change may be used to determine edges, locations of fields, and locations of tabs. In the example of FIG. 6, the image has been converted to black and white and the contrast increased to 100%. Tabs, at longitude 610 may be located based on their relative size and proximity to one another, based on the white outline. Similarly, editable fields located at longitude 620 can be recognized as white rectangles. Uneditable/fixed fields, such as one at longitude 630 can be recognized as black rectangles with white outlines. Actionable buttons at longitude 640 can be recognized by location, size, and white outline only at the top and left, which shows the length and width of such buttons. Portions of the original image (shown in FIG. 3) at the determined location of the various actionable or information-giving objects can then be extracted and with the use of OCR, as described above, the data can be converted to text and placed into a common user interface or otherwise used. Further, based on these locations, when a user or automated process using a common interface desires to change a value, an automated or manual process can be instructed as to the exact location and action to carry out in the proprietary interface.

Figure 7:
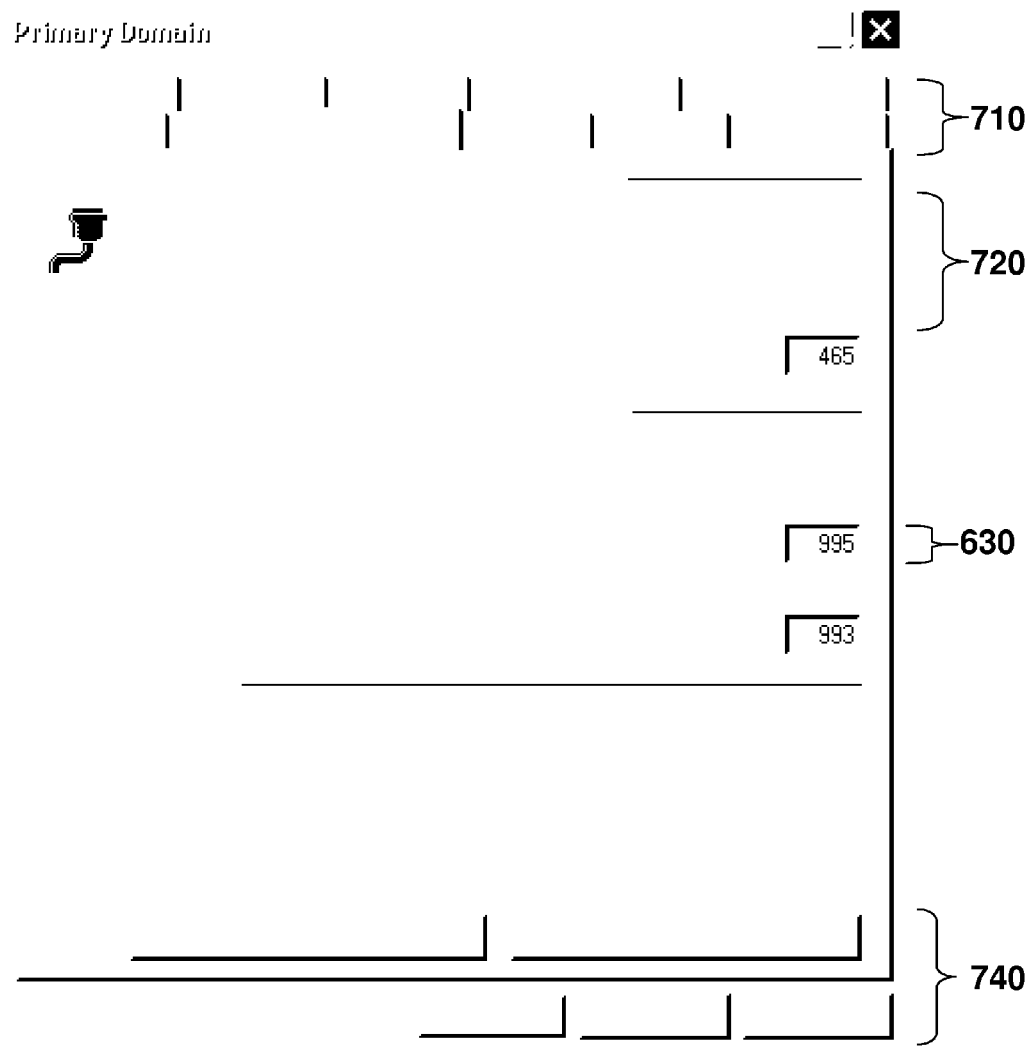
FIG. 7 shows an example of a color selection technique for an image of a proprietary interface in an embodiment of the disclosed technology.

FIG. 7 shows an example of a color selection technique for an image of a proprietary interface in an embodiment of the disclosed technology. Elements of FIG. 7 have been incremented by 100 over FIG. 6. The image, in this case, and further due to the black and white nature of patent publications, shows shadows between tabs at longitude 710, fails to show editable boxes at longitude 720, shows white boxes with text therein for each uneditable box, e.g., at longitude 730, and shows bottom and right shadows for actionable buttons at longitude 740.

Data garnered from multiple variations of the input image, in embodiments of the disclosed technology, is combined to learn the location of actionable and other items. For example, in FIG. 3, uneditable box 316 is shown, but, given its similarity in features to, for example, editable box 314, it is difficult to discern the difference. In the version of the image shown in FIG. 6, the uneditable box 316 appears in black with a lower and right shadow in white. In the version of the image shown in FIG. 6, the box is in white, only the values associated with non-editable boxes are viewable, and an upper and left shadow is visible. Combining these features assures greater accuracy in determining, especially by automated processes, the nature of the portion of the image which represents uneditable text.

Figure 8:
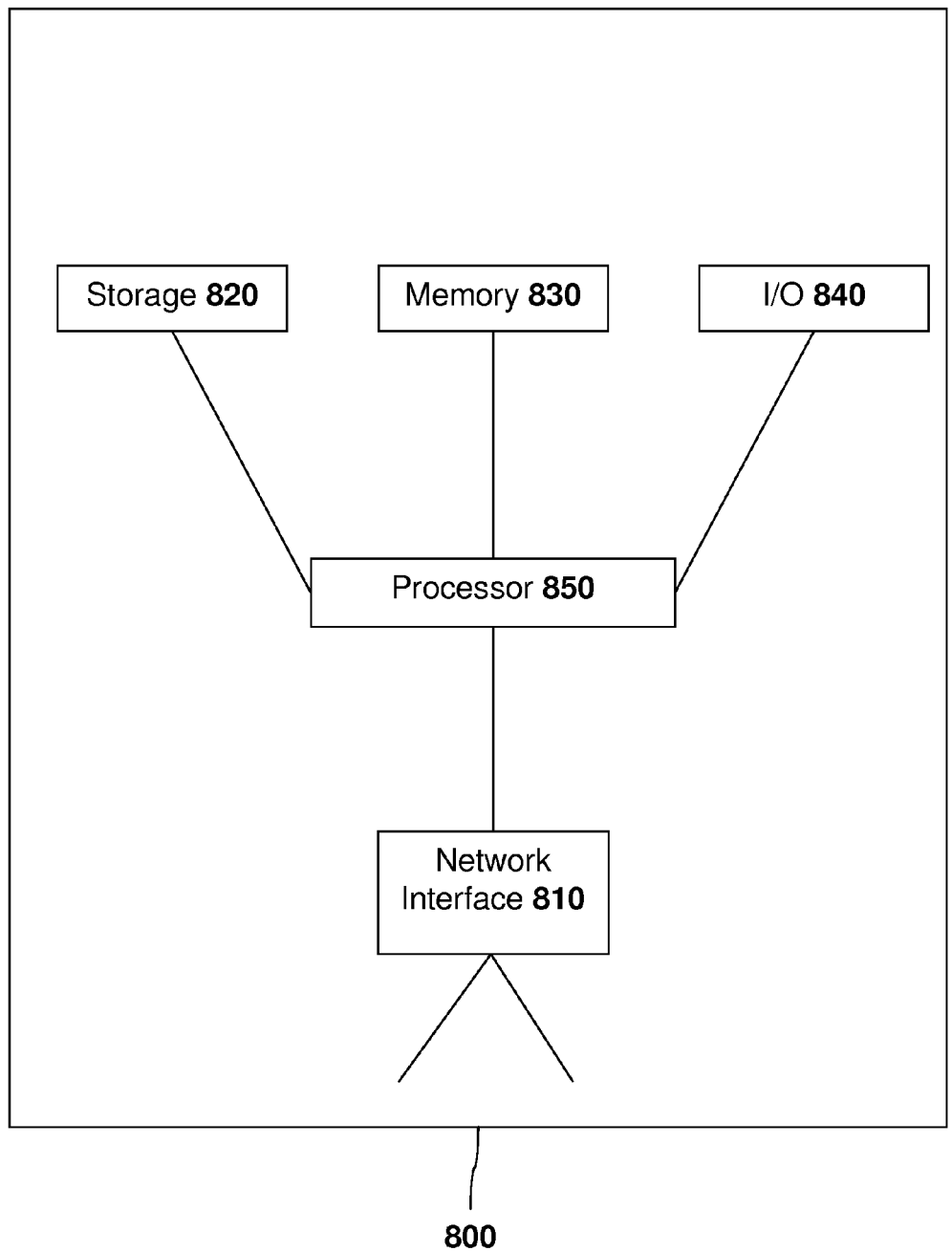
FIG. 8 shows a high-level block diagram of a device that may be used to carry out the disclosed technology.

FIG. 8 shows a high-level block diagram of a device that may be used to carry out the disclosed technology. Device 800 comprises a processor 850 that controls the overall operation of the computer by executing the device's program instructions which define such operation. The device's program instructions may be stored in a storage device 820 (e.g., magnetic disk, database) and loaded into memory 830 when execution of the console's program instructions is desired. Thus, the device's operation will be defined by the device's program instructions stored in memory 830 and/or storage 820, and the console will be controlled by processor 850 executing the console's program instructions. A device 800 also includes one or a plurality of input network interfaces for communicating with other devices via a network (e.g., the internet). A device 800 also includes one or more output network interfaces 810 for communicating with other devices. Device 800 also includes input/output 840 representing devices which allow for user interaction with a computer (e.g., display, keyboard, mouse, speakers, buttons, etc.). One skilled in the art will recognize that an implementation of an actual device will contain other components as well, and that FIG. 8 is a high level representation of some of the components of such a device for illustrative purposes. It should also be understood by one skilled in the art that the method and devices depicted in FIGS. 1 through 7 may be implemented on a device such as is shown in FIG. 8.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the invention.

I claim:

1. A device exhibiting a common interface interacting with a plurality of proprietary user interfaces, each said proprietary user interface providing interaction with a specialized hardware device, said device comprising:
   a camera with means for recording an image of said proprietary user interface;
   optical character recognition means for extracting text from said image;
   sensing means for extracting locations comprising actionable objects within said image;
   exhibiting means exhibiting actionable data resulting from said optical character recognition means and said sensing means in said common user interface.

2. The device of claim 1, wherein said device propagates a user-configured change to actionable objects in said common user interface to said specialized hardware device via said proprietary user interface.

3. The device of claim 2, wherein said specialized hardware device comprises biomedical equipment.

4. The device of claim 3, wherein said biomedical equipment comprises a radiology machine.

5. The device of claim 1, wherein at least one said proprietary user interface is interactable only at a proximate physical location of said specialized hardware device.

6. The device of claim 5, wherein said common interface is at a location remote from said proximate physical location of said at least one said proprietary user interface.

7. The device of claim 1, wherein said sensing means comprise field detection.

8. The device of claim 7, wherein said sensing means further comprise edge detection by way of color manipulation of said image.

9. The device of claim 8, wherein said exhibiting means comprise exhibiting said common user interface in a structured data format configured for a human-configured automated process to monitor at least one said specialized hardware device.

10. The device of claim 9, wherein said human-configured automated process configures an aspect of at least one said specialized hardware device.

11. A method for manipulating a specialized hardware device comprising:
   receiving an image of a proprietary user interface of said specialized hardware device;
   using optical character recognition to extract text from said image;
   extracting locations comprising actionable objects exhibited in said image and connecting said actionable objects with said text; and
   creating a common interface based on said text and said actionable objects for manipulating said specialized hardware device.

12. The method of claim 11, wherein said common user interface comprises a common interface for manipulating a plurality of proprietary user interfaces.

13. The method of claim 12, wherein said manipulating comprises monitoring.

14. The method of claim 13, wherein said manipulating further comprises modifying a configurable element of said specialized hardware device.

15. The method of claim 11, wherein said specialized hardware device comprises biomedical equipment.

16. The method of claim 15, wherein said biomedical equipment comprises a radiology machine.

17. The method of claim 11, wherein said proprietary user interface is interactable only at a proximate physical location of said specialized hardware device.

18. The method of claim 17, wherein said common interface is at a location remote from said proximate physical location of at least one said proprietary user interface.

19. The method of claim 11, wherein said locations are extracted using edge detection.

20. The method of claim 19, wherein said locations are extracted by way of varying colors of said image.

* * * * *